(12) United States Patent
Takahashi et al.

(10) Patent No.: US 8,811,813 B2
(45) Date of Patent: Aug. 19, 2014

(54) ELECTRONIC DEVICE

(75) Inventors: Tomoki Takahashi, Kamagaya (JP); Yasuhiro Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/211,215

(22) Filed: Aug. 16, 2011

(65) Prior Publication Data

US 2012/0045196 A1    Feb. 23, 2012

(30) Foreign Application Priority Data

Aug. 19, 2010 (JP) ................................ 2010-184278
Aug. 19, 2010 (JP) ................................ 2010-184279

(51) Int. Cl.
*G03B 13/02* (2006.01)
*H04N 3/16* (2006.01)

(52) U.S. Cl.
USPC ..................................... 396/374; 348/333.06

(58) Field of Classification Search
USPC ............................... 396/374, 383; 348/333.06
See application file for complete search history.

(56) References Cited

U.S. PATENT DOCUMENTS

2010/0234073 A1* 9/2010 Kusano .......................... 455/566

FOREIGN PATENT DOCUMENTS

| CN | 101375227 A | 2/2009 |
| JP | 2005-303688 A | 10/2005 |
| JP | 2009-065634 A | 3/2009 |
| JP | 2009-164760 A | 7/2009 |
| WO | WO 2007086333 A1 * | 8/2007 |

* cited by examiner

*Primary Examiner* — Clayton E Laballe
*Assistant Examiner* — Noam Reisner
(74) *Attorney, Agent, or Firm* — Canon USA Inc IP Division

(57) ABSTRACT

First and second magnets are provided in a movable unit that is coupled with a body, the movable unit being rotatable with respect to the body around a first axis and a second axis that is substantially perpendicular to the first axis. First and second magnetic-field sensors are provided in the body. Based on output signals of the first and second magnetic-field sensors, control is performed in accordance with a state of the movable unit with respect to the body.

13 Claims, 12 Drawing Sheets

FIG. 12

| DISPLAY FORM OF DISPLAY PORTION | | DISPLAY PORTION FACING INWARD, CLOSED STATE, (FIRST STATE) | (FIFTH STATE) | DISPLAY PORTION FACING INWARD, OPEN STATE, (SECOND STATE) | DISPLAY PORTION FACING OUTWARD, OPEN STATE (THIRD STATE) | (SIXTH STATE) | DISPLAY PORTION FACING OUTWARD, CLOSED STATE, (FOURTH STATE) |
|---|---|---|---|---|---|---|---|
| | | LIGHT OFF FIRST (DISPLAY FORM) | LIGHT ON (NORMAL DISPLAY) SECOND (DISPLAY FORM) | LIGHT ON (NORMAL DISPLAY) SECOND (DISPLAY FORM) | LIGHT ON (VERTICAL INVERSION) THIRD (DISPLAY FORM) | LIGHT ON (VERTICAL INVERSION) THIRD (DISPLAY FORM) | LIGHT ON (VERTICAL/ HORIZONTAL INVERSION) FOURTH (DISPLAY FORM) |
| FIRST MAGNETIC SENSOR | FIRST OUTPUT | LOW (ON) | HIGH (OFF) | HIGH (OFF) | HIGH (OFF) | LOW (ON) | HIGH (OFF) |
| | SECOND OUTPUT | HIGH (OFF) | LOW (ON) | HIGH (OFF) | HIGH (OFF) | HIGH (OFF) | LOW (ON) |
| SECOND MAGNETIC SENSOR | | HIGH (OFF) | HIGH (OFF) | HIGH (OFF) | LOW (ON) | LOW (ON) | LOW (ON) |

ELECTRONIC DEVICE

BACKGROUND OF THE INVENTION

1. Field of the Invention

The present invention relates to an electronic device in which a movable unit is rotatably coupled with a body.

2. Description of the Related Art

An electronic device, such as a digital camera or a video camera, may include a body and a display unit including a display portion such as a liquid crystal display. The display unit is coupled with the body and is rotatable with respect to the body around a first axis and a second axis. Such a camera can easily perform photographing at various angles by rotating the display unit.

However, with such an electronic device, a proper image cannot be displayed on the display portion unless a display form of an image to be displayed on the display portion is changed in accordance with a rotation state of the display unit.

That is, with an electronic device in which a movable unit is rotatably coupled with a body, control has to be performed in accordance with a state or orientation of the movable unit with respect to the body.

SUMMARY OF THE INVENTION

An aspect of the present invention is an electronic device including a body; and a movable unit coupled with the body, the movable unit being rotatable with respect to the body around a first axis and a second axis that is substantially perpendicular to the first axis. The movable unit includes a first magnetic-field generating portion arranged near the first axis; and a second magnetic-field generating portion arranged at a position at which the second magnetic-field generating means is substantially symmetric to the first magnetic-field generating portion about the second axis. The body includes a first magnetic-field detection sensor arranged near a position at which the first magnetic-field detection sensor faces one of the first and second magnetic-field generating portions in a state in which the movable unit is rotated around the first axis and approaches the body; a second magnetic-field detection sensor arranged near the first axis; and a control unit configured to perform control in accordance with a state of the movable unit with respect to the body based on output signals of the first and second magnetic-field detection sensors.

Further features of the present invention will become apparent from the following description of exemplary embodiments with reference to the attached drawings.

BRIEF DESCRIPTION OF THE DRAWINGS

FIG. 12 is an illustration explaining a change in display form of a display portion based on output signals from the magnetic sensors.

DESCRIPTION OF THE EMBODIMENTS

An embodiment of the present invention will be described below with reference to the drawings.

Figure 1:
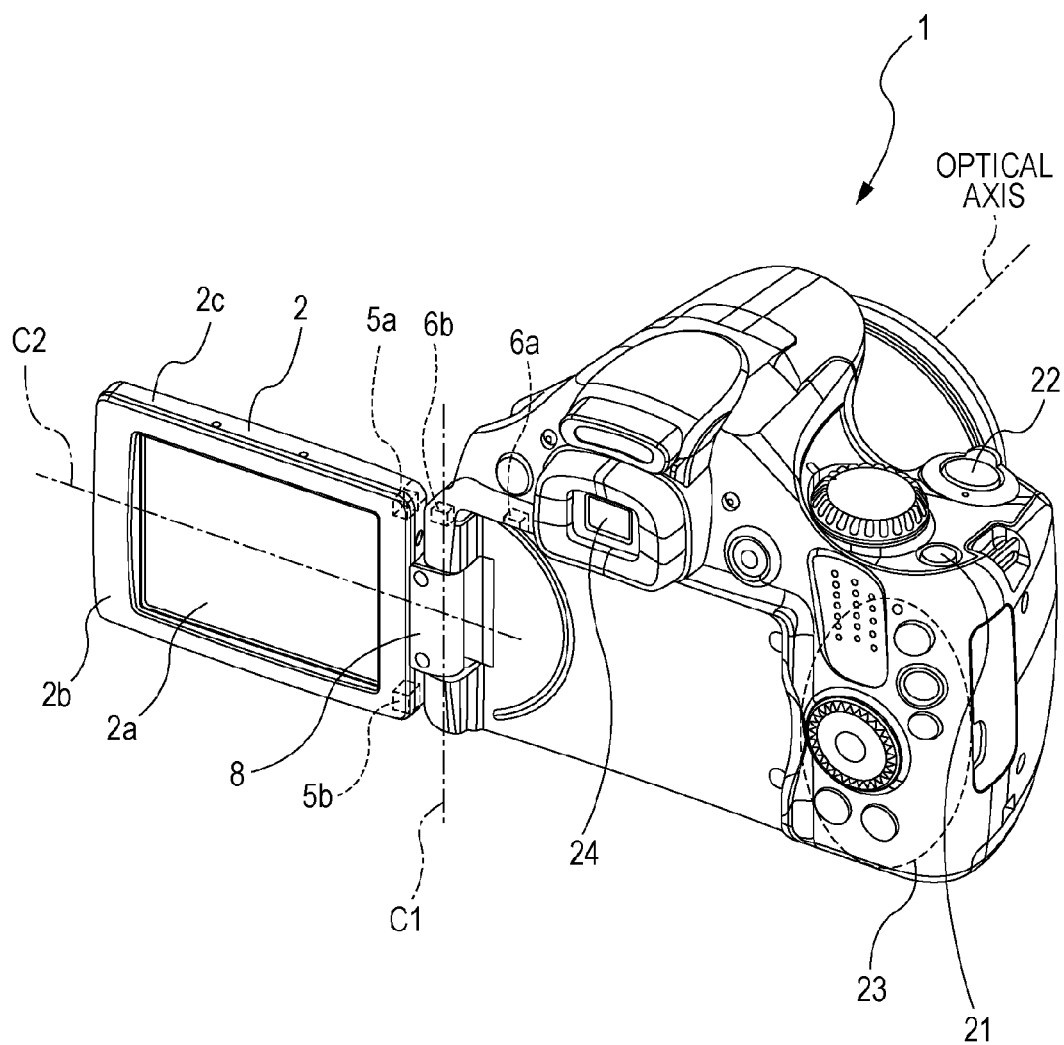
FIG. 1 is an external perspective view of a rear surface of a digital camera according to an embodiment of the present invention.

FIG. 1 is an external perspective view of a rear surface (side of a photographer) of a digital camera that is an electronic device according to an embodiment of the present invention. In FIG. 1, a display unit 2, which serves as a movable unit, is coupled with a camera body 1, which serves as a body, rotatably with respect to the camera body 1 around a first axis C1 and a second axis C2. Hereinafter, to distinguish an operation for rotating the display unit 2 around the first axis C1 from an operation for rotating the display unit 2 around the second axis C2, the operation for rotating the display unit 2 around the first axis C1 is occasionally called open/close operation, and the operation for rotating the display unit 2 around the second axis C2 is occasionally called rotation operation. Also, an angle of the display unit 2 in a rotation direction around the first axis C1 with respect to the camera body 1 is occasionally called opening angle, and an angle of the display unit 2 in a rotation direction around the second axis C2 with respect to the camera body 1 is occasionally called rotation angle.

A display portion 2a such as a liquid crystal display displays a photographed image and a reproduced image. The display portion 2a can also display photographic conditions, such as a shutter speed and an f-number, the number of photographed images, a menu, etc. A body power supply switch 21 is operated to turn ON or OFF a body power supply. A release switch 22 is operated to start a photographing operation. An operation button group 23 is operated to execute various operations.

A photographic optical system including an image pickup element such as a CCD is arranged at a front surface of the camera body 1. The photographic optical system forms an object image that enters the photographic optical system in an optical-axis direction, on the image pickup element. In a photographing mode, the display portion 2a can successively display captured images (hereinafter, also referred to as live view image or through-the-lens image) based on the object image formed on the image pickup element. When a photographer presses the release switch 22 at a desirable timing, image data captured by the image pickup element is processed with various image processing, and is stored in a storage unit. In a reproducing mode, stored image data is read, and the display portion 2a is controlled to display an image and information.

Also, by displaying a live view image or the like on a viewfinder 24 in a state in which the body power supply is ON and a light of the display portion 2a is OFF, a photographer can check an object or a composition while looking through the viewfinder 24.

Described next is an arrangement example of two magnetic sensors provided in the camera body 1 and two magnets provided in the display unit 2.

The digital camera shown in FIG. 1 is in a state in which the display unit 2 is rotated with respect to the camera body 1 by about 180° around the first axis C1 (this state is the same as a state in FIG. 3C, which will be described later), from a state in which the display portion 2a faces the camera body 1. A hinge portion 8 couples the camera body 1 with the display unit 2. The hinge portion 8 includes a hinge mechanism of two axes of the first axis C1 and the second axis C2 so that the display unit 2 can be rotated with respect to the camera body 1. The second axis C2 is substantially perpendicular to the first axis C1.

A first magnetic sensor 6a, which is a magnetic-field detection sensor, arranged in the camera body 1 is used for detection of an open/close operation or an open/close state of the display unit 2 with respect to the camera body 1. The first magnetic sensor 6a is arranged near a position at which the first magnetic sensor 6a faces a magnet 5a in a state in which the display unit 2 is rotated around the first axis C1 and approaches the camera body 1 (in the state in FIG. 3C, which will be described later).

A second magnetic sensor 6b, which is a magnetic-field detection sensor, arranged in the camera body 1 is arranged near the first axis C1 and is used for detection of a rotation operation or a rotation state of the display unit 2 with respect to the camera body 1. This embodiment provides an example in which the second magnetic sensor 6b is arranged on the first axis C1.

Although the detail is described later, the first and second magnetic sensors are arranged near the hinge portion 8 of the camera body 1 so that the first and second magnetic sensors detect magnetic fields parallel to the first axis C1.

The magnet 5a and a magnet 5b, which are magnetic-field generating portions, are formed of magnet pieces having the same rectangular-parallelepiped shape and the same magnetic force. The magnets 5a and 5b are arranged in the display unit 2 at positions near the hinge portion 8 such that the magnets 5a and 5b are substantially symmetric about the second axis C2. Also, the magnets 5a and 5b are arranged such that their north poles are arranged at the upper side and their south poles are arranged at the lower side of the camera body 1 in the state in FIG. 1, to generate the magnetic fields substantially parallel to the first axis C1. In other words, critical planes between the north poles and the south poles of the magnets 5a and 5b are substantially orthogonal to the first axis C1.

The display unit 2 includes a front case 2b made of resin and a rear case 2c made of an aluminum member. Hence, both the front case 2b and the rear case 2c are non-magnetic. The magnets 5a and 5b are inserted into recesses (not shown) provided in the front case 2b with high positioning accuracy, fixed by an adhesive, and covered with the rear case 2c, to prevent the magnets 5a and 5b from falling. When the display unit 2 is rotated around the first axis C1 and the second axis C2, the magnets 5a and 5b are also moved accordingly. A protrusion (not shown) provided at the front case 2b engages with a recess (described later) of a forming member of the hinge portion 8 with high accuracy, and are fixed by a screw. Thus, the display unit 2 including the display portion 2a and the magnets 5a and 5b is rotated as a unit.

Next, movable ranges of the display unit 2 with respect to the camera body 1 when viewed from a bottom surface and a side surface of the digital camera according to this embodiment will be described with reference to FIGS. 2A and 2B.

Figure 2A:
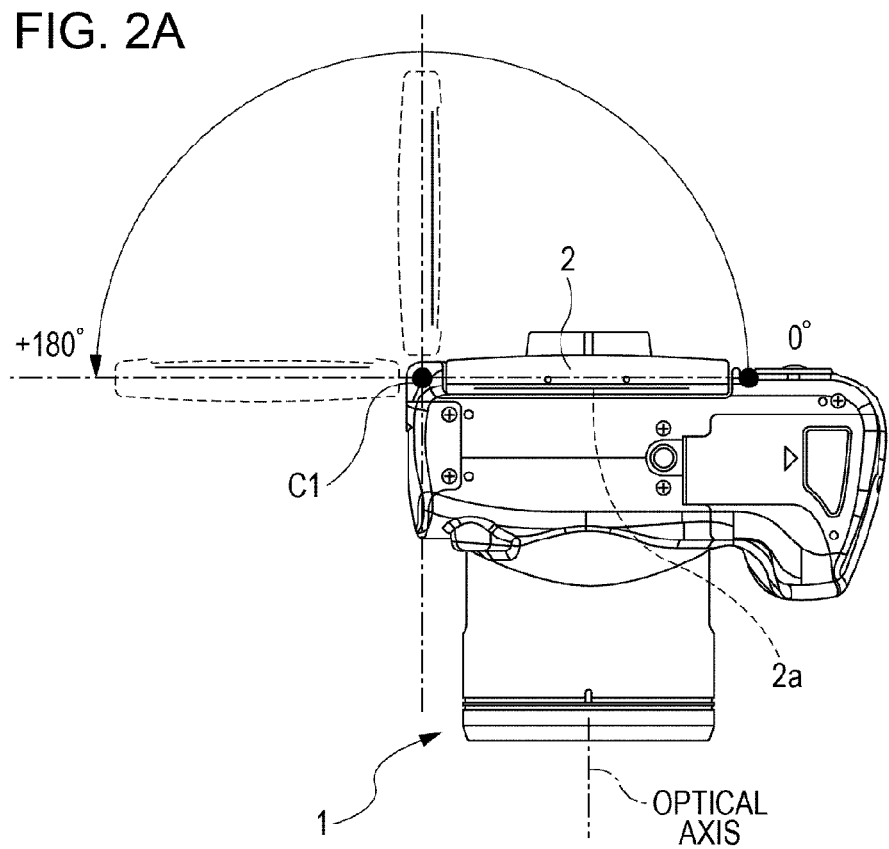
FIGS. 2A and 2B are illustrations showing movable ranges of a display unit of the digital camera according to the embodiment of the present invention.
Figure 2B:
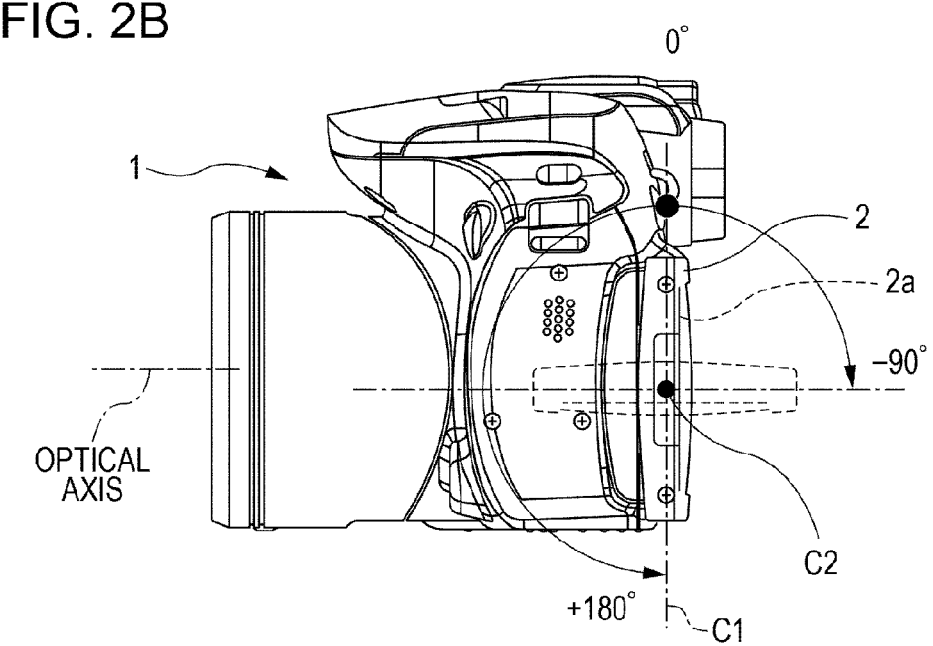

FIG. 2A is an external view from the bottom surface of the camera body 1. As described above, the display unit 2 can be rotated from 0° to about 180° around the first axis C1. FIG. 2B is a side view when the display unit 2 in FIG. 2A is rotated by about 180° around the first axis C1. The display unit 2 can be further rotated from the state in FIG. 2B in a range from about −90° to about +180° around the second axis C2. In this embodiment, in the state shown in FIG. 2B, rotating the display unit 2 counterclockwise around the second axis C2 represents rotation in a + direction, and rotating the display unit 2 clockwise around the second axis C2 represents rotation in a − direction.

Next, moving states of the display unit 2 with respect to the camera body 1 will be described with reference to FIGS. 3A to 3D, and 4A to 4E. As shown in FIGS. 3A to 3D, and 4A to 4E, in the digital camera of this embodiment, the display unit 2 including the display portion 2a at the rear surface of the camera body 1 is coupled with the camera body 1 rotatably in the range from 0° to about 180° around the first axis C1. The display unit 2 is housed in a recess that is formed in a rear cover 3 arranged at the rear surface of the camera body 1 when the opening angle of the display unit 2 is 0° (full-closed state).

Also, the display unit 2 is coupled with the camera body 1 rotatably with respect to the camera body 1 in a range between about 180° at the + side and about 90° at the − side around the second axis C2. The rear cover 3 and a front cover 4 of the camera body 1 are formed of non-magnetic or feebly magnetic members.

Figure 3A:
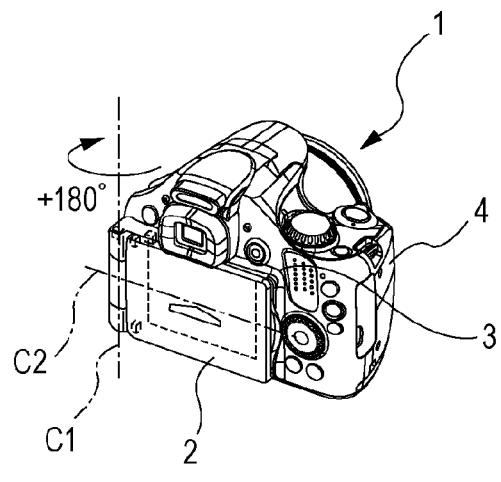
FIGS. 3A to 3D are illustrations showing moving states of the display unit of the digital camera according to the embodiment of the present invention.
Figure 3B:
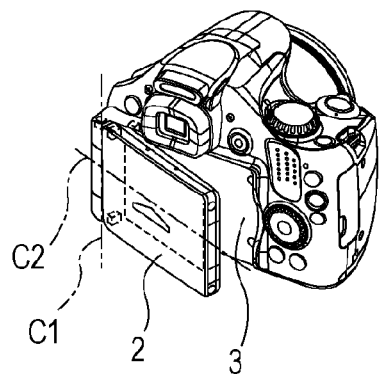
Figure 3C:
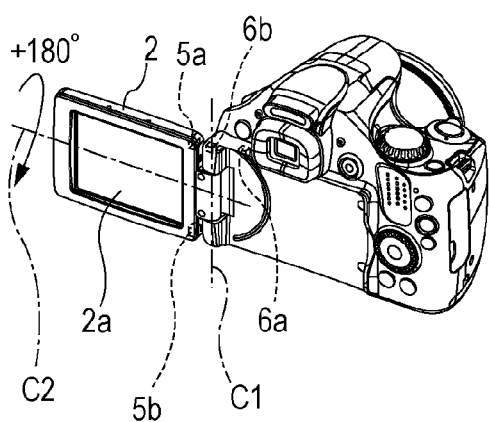
Figure 3D:
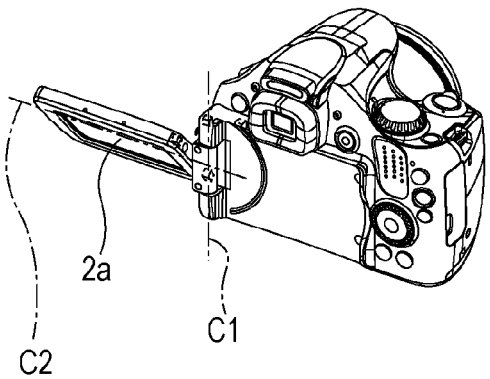

Next, transition of the state when the mode is the photographing mode, the body power supply is turned ON, and the display unit 2 is moved with respect to the camera body 1 will be described in detail. The display unit 2 can be rotated with respect to the camera body 1 by the hinge mechanism of the two axes of the first axis C1 and the second axis C2. In an initial state shown in FIG. 3A, the display portion 2a faces inward, i.e., the display portion 2a faces the camera body 1, and the display unit 2 has the opening angle of 0°. In this state, the photographer has difficulty in checking the displayed content of the display portion 2a. Hence, the light of the display portion 2a is turned OFF, and the display portion 2a displays nothing. FIG. 3B is a state during the rotation (opening) of the display unit 2 around the first axis C1. When the display unit 2 is rotated by a predetermined angle around the first axis C1, it is detected that the display unit 2 is in an open state, which will be described later, and then the light of the display portion 2a is turned ON. At this time, the display portion 2a displays a live view image that is formed on the image pickup element such as a CCD through the photographic optical system (not shown). In this embodiment, the vertical and horizontal directions of an image displayed on the display portion 2a with respect to the display unit 2 in this state represent a normal state. Displaying an image in the normal state is normal display. FIG. 3C is a state in which the display unit 2 is rotated by about 180° around the first axis C1 (full-open state). The display unit 2 can be rotated from this state in a range between about −90° to about +180° around the second axis C2. For example, as shown in FIG. 3D, in a state in which the display unit 2 is rotated by about −45°, the photographer can easily check an object or a composition in a photographing screen during high-angle photographing such as when the photographer cannot look through the viewfinder 24.

Figure 4A:
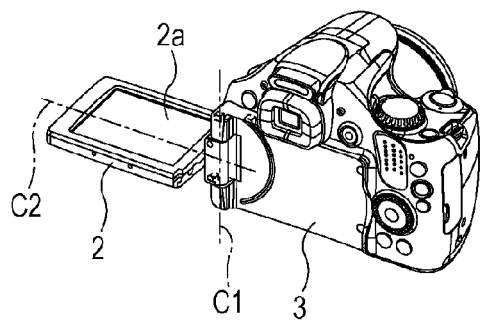
FIGS. 4A to 4E are illustrations showing moving states of the display unit of the digital camera according to the embodiment of the present invention.

FIG. 4A is a state in which the display unit 2 is rotated around the second axis C2 by about +90° from the state in FIG. 3C. The photographer can easily check an object or a composition in a photographic screen during low-angle photographing.

Figure 4B:
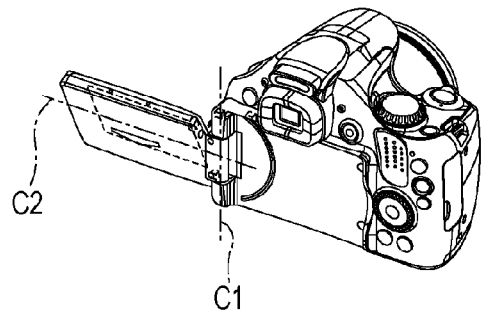

Then, when the display unit 2 is rotated in the + direction around the second axis C2 from the state in FIG. 4A, it is detected that the display unit 2 is rotated by a predetermined angle or larger in the + direction in a state in FIG. 4B, which will be described later. An image that is vertically inverted from the normal state is displayed on the display portion 2*a*. Then, the state is transited to a state in FIG. 4C in which the display unit 2 is rotated in the + direction around the second axis C2 by about +180°, while the vertical inversion of the displayed image is maintained. In this state, the photographing direction of the photographic optical system is the same as the display direction of the display portion 2*a*. Hence, this state is suitable for photographing the photographer by himself/herself, i.e., for self shot.

Figure 4C:
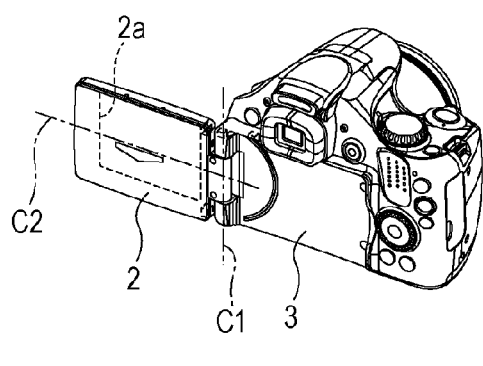
Figure 4D:
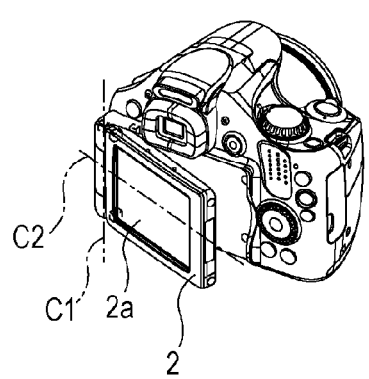
Figure 4E:
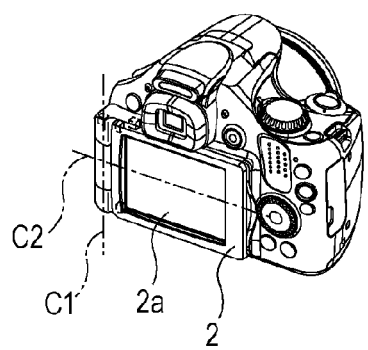

When the display unit 2 is rotated around the first axis C1 to approach the camera body 1 from the state in FIG. 4C, the state becomes a state in FIG. 4D. At this time, it is detected that the display unit 2 is in a closed state, which will be described later, and an image that is vertically and horizontally inverted from the normal state is displayed on the display portion 2*a*. When the display unit 2 is rotated to further approach the camera body 1, the state becomes a full-closed state in FIG. 4E, and the display unit 2 is locked with respect to the camera body 1 by an elastic lock mechanism. FIG. 4E is the full-closed state (the opening angle being 0°) with the display portion 2*a* facing outward. In this state, like a digital camera in which a display portion 2*a* is fixed to a rear surface of a camera body 1, an object or a composition in a photographing screen can be checked from the rear surface of the camera body 1. Hence, the photographer can easily follow a moving object.

As described above, in this embodiment, the open/close operation and the rotation operation of the display unit 2 are detected, and the display form of the display portion 2*a* is appropriately transited, for example, from turning OFF the light, to turning ON the light (normal display), turning ON the light (vertical inversion), and turning ON the light (vertical/horizontal inversion).

Figure 5A:
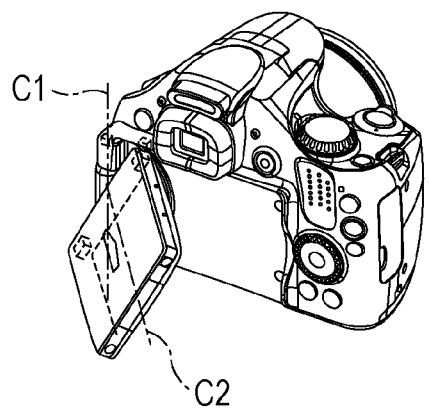
FIGS. 5A and 5B are illustrations showing moving states of the display unit of the digital camera according to the embodiment of the present invention.
Figure 5B:
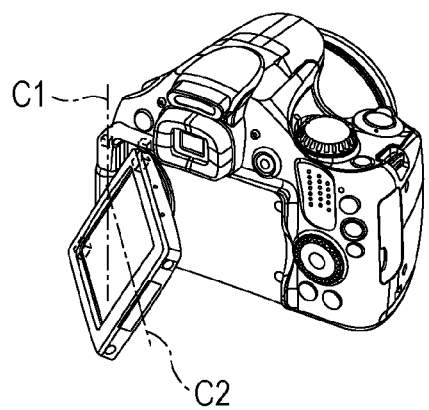

During transition from the state in FIG. 3B to the state in FIG. 3C, when the display unit 2 is rotated in the – direction around the second axis C2, the state becomes a state in FIG. 5A. Also, during transition from the state in FIG. 4C to the state in FIG. 4D, when the display unit 2 is rotated in the – direction around the second axis C2, the state becomes a state in FIG. 5B.

In this embodiment, it is determined that the direction of the display portion 2*a* is one of two states including a direction in which the display portion 2*a* faces the camera body 1 in the full-closed state (inward direction) and a direction in which the display portion 2*a* faces a side opposite to the camera body 1 (outward direction). In this embodiment, even in the state in which the display portion 2*a* faces the photographer like the state in FIG. 3C, the direction of the display portion 2*a* is assumed as the inward direction, unless the display unit 2 is rotated by a predetermined angle or larger around the second axis C2 from the direction in which the display portion 2*a* faces the camera body 1 in the full-closed state.

Next, a magnetic sensor used for detection of the rotation operation of the display unit 2 will be described with reference to FIGS. 6A to 6D. In general, an element that detects magnetism may be, for example, a giant magnetoresistance (GMR) element or a semiconductor Hall element.

The GMR element is a device that detects a magnetic field parallel to a principal plane by using a magnetoresistance effect. The GMR element is made of an alloy having a characteristic that an electric resistance increases as a magnetic field is stronger (specifically, mainly containing nickel, iron, and cobalt). A single GMR element or a plurality of GMR elements are used, and a judgment circuit is mounted, to form a GMR sensor.

Figure 6A:
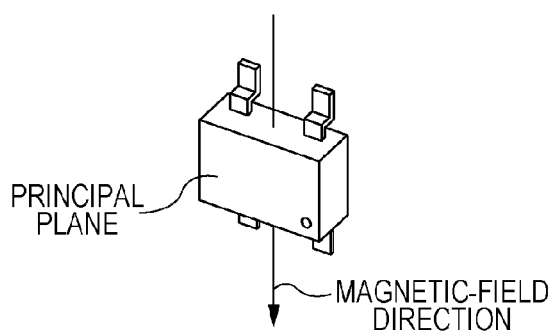
FIGS. 6A to 6D are illustrations explaining magnetic sensors of the digital camera according to the embodiment of the present invention.

FIG. 6A illustrates a single-polarity one-output GMR sensor that detects a magnetic field only in one direction. For example, when 2 mT is a threshold of the density of the magnetic flux penetrating through the GMR sensor, if the magnetic-flux density is higher than the threshold, a LOW (ON) signal is output, and if the magnetic-flux density is lower than the threshold, a HIGH (OFF) signal is output. In the case of the single-polarity one-output GMR sensor, even though the sensor receives a value of 2 mT or higher, if the direction of the magnetic field is opposite, the sensor outputs the HIGH (OFF) signal.

Figure 6B:
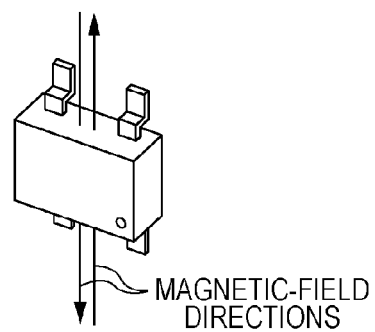

FIG. 6B illustrates a dual-polarity two-output GMR sensor that detects magnetic fields in two directions. For example, when 3 mT is a threshold of the density of the magnetic flux penetrating through the GMR sensor, if the magnetic-flux density is higher than the threshold, a LOW (ON) signal is output, and if the magnetic-flux density is lower than the threshold, a HIGH (OFF) signal is output. In the case of the dual-polarity two-output GMR sensor, two sensors that detect magnetic fields are arranged in opposite directions. If the magnetic-flux density is higher than 3 mT, one of the sensors outputs the LOW (ON) signal, and the other of the sensors outputs the HIGH (OFF) signal. When the directions of the magnetic fields are reversed, the outputs are inverted.

In contrast, a Hall element is a device that detects a magnetic field perpendicular to a principal plane by using a Hall effect. A single Hall element or a plurality of Hall elements are used, and a judgment circuit is mounted, to form a Hall sensor.

Figure 6C:
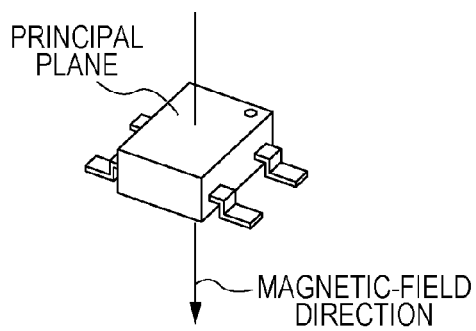

FIG. 6C illustrates a single-polarity one-output Hall sensor that detects a magnetic field only in one direction perpendicular to a principal plane. For example, when 2 mT is a threshold of the density of the magnetic flux penetrating through the Hall sensor, if the magnetic-flux density is higher than the threshold, a LOW (ON) signal is output, and if the magnetic-flux density is lower than the threshold, a HIGH (OFF) signal is output. In the case of the single-polarity one-output Hall sensor, even though the sensor receives a value of 2 mT or higher, if the direction of the magnetic field is opposite, the sensor outputs the HIGH (OFF) signal.

Figure 6D:
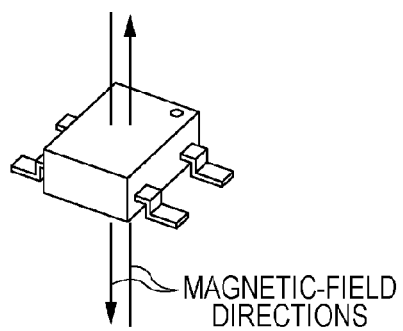

FIG. 6D illustrates a dual-polarity two-output Hall sensor that detects magnetic fields in two directions perpendicular to a principal plane. For example, when 3 mT is a threshold of the density of the magnetic flux penetrating through the Hall sensor, if the magnetic-flux density is higher than the threshold, a LOW (ON) signal is output, and if the magnetic-flux density is lower than the threshold, a HIGH (OFF) signal is output.

In the case of the dual-polarity two-output Hall sensor, two sensors that detect magnetic fields are arranged in opposite directions. If the magnetic-flux density is higher than 3 mT, one of the sensors outputs the LOW (ON) signal, and the other of the sensors outputs the HIGH (OFF) signal. When the directions of the magnetic fields are reversed, the outputs are inverted.

In this way, the magnetic sensor may be selected in accordance with the direction with respect to the principal plane in which the magnetic sensor can detect the magnetic flux and whether the magnetic sensor is of the single polarity or dual polarity. By selecting high sensitivity or low sensitivity depending on the location of use, the magnetic sensor can be used in various ways of use. In this embodiment, the principal plane of the magnetic sensor indicates an upper surface of the magnetic sensor when a lower surface thereof is mounted on a substrate.

Figure 7:
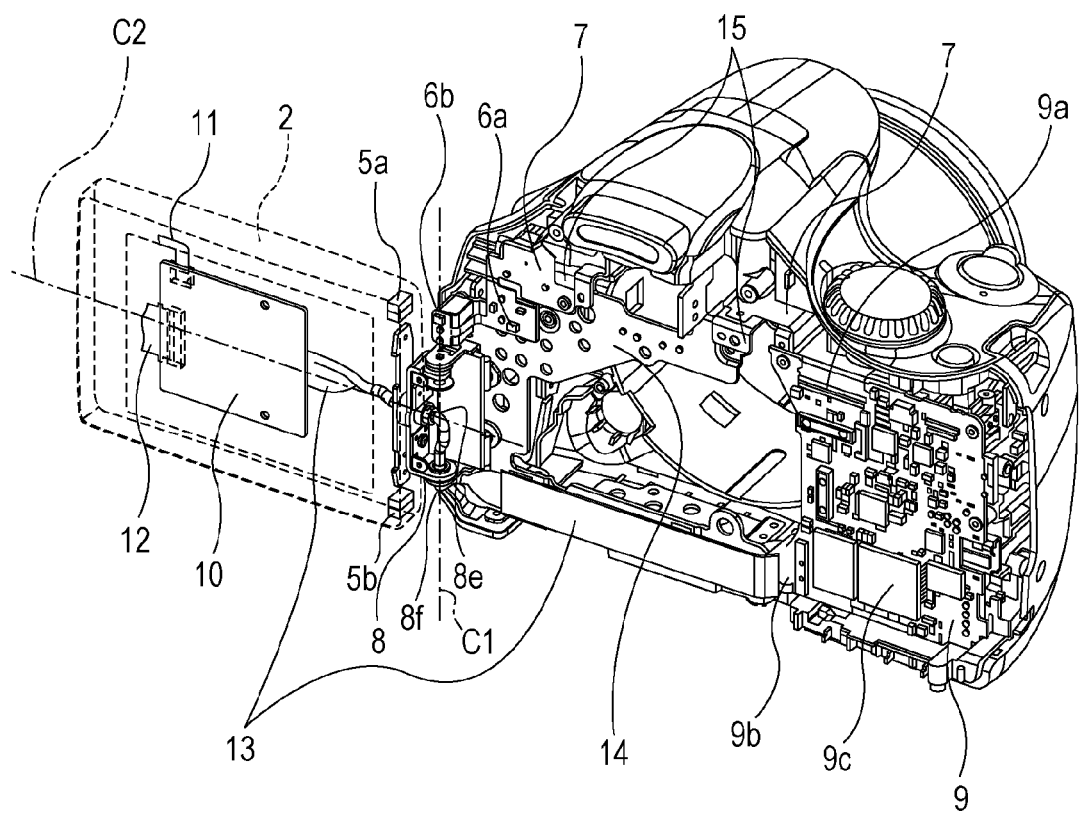
FIG. 7 is an external perspective view of the rear surface of the digital camera according to the embodiment of the present invention when a rear cover unit is removed.

In this embodiment, the first magnetic sensor used for the open/close detection is the dual-polarity two-output GMR sensor with a threshold of 3 mT, and the second magnetic sensor used for the rotation detection is the single-polarity one-output GMR sensor with a threshold of 2 mT. FIG. 7 is an illustration of the digital camera of this embodiment in the state in FIG. 1 when the rear cover 3 is removed for explaining the inner configuration of the digital camera. The outline of the display unit 2 is indicated by broken lines.

The magnetic sensors 6a and 6b are mounted on an upper surface flexible printed circuit (FPC) board 7. A main chassis 14 and an upper surface chassis 15 are made of metal members because the main chassis 14 and the upper surface chassis 15 need certain intensities as a main casing of the camera body 1. In this embodiment, the main chassis 14 and the upper surface chassis 15 are arranged near the magnetic sensors. Hence, the main chassis 14 and the upper surface chassis 15 use stainless steel that is a non-magnetic metal member with regard to the influence of disturbance of magnetic fields and magnetization. The upper surface FPC 7 is positioned at and fixed to the upper surface chassis 15. The upper surface chassis 15 is positioned at and fixed to the main chassis 14. Operation switches, and circuits and electrical parts for a strobe light are mounted on the upper surface FPC 7. The upper surface FPC 7 is connected to a main board 9 through a flexible connector 9a.

A CPU 9c is arranged on the main board 9. The CPU 9c controls respective portions of the digital camera according to this embodiment, and hence performs control in accordance with the moving state of the display unit 2 with respect to the camera body 1 based on output signals of the first and second magnetic sensors.

A wire harness 13 is a connecting line including a fine coaxial line group. The wire harness 13 electrically connects a LCD substrate 10 embedded in the display unit 2 with a harness connector 9b arranged on the main board 9. The wire harness 13 is inserted through two holes 8e and 8f provided in the hinge portion 8. Hence, the number of wires is minimized, and the sizes of the holes 8e and 8f are minimized, to reduce the size of the hinge portion 8. The LCD substrate 10 and the wire harness 13 are connected to each other by a connector (not shown). Reference sign 12 denotes part of a FPC connected to a LCD that is a display device. Reference sign 11 denotes part of a FPC connected to a backlight of the display device.

The wire harness 13 is arranged near the hinge portion 8 so as to pass through a position where the first magnetic sensor 6a or the second magnetic sensor 6b is not arranged. Further, the wire harness 13 enters the hinge portion 8 at a position on the first axis C1 of the camera body 1, from a side where the second magnetic sensor 6b is not arranged. Accordingly, the space around the hinge portion 8 is efficiently used while the wire harness 13 does not overlap the magnetic sensors.

Figure 8:
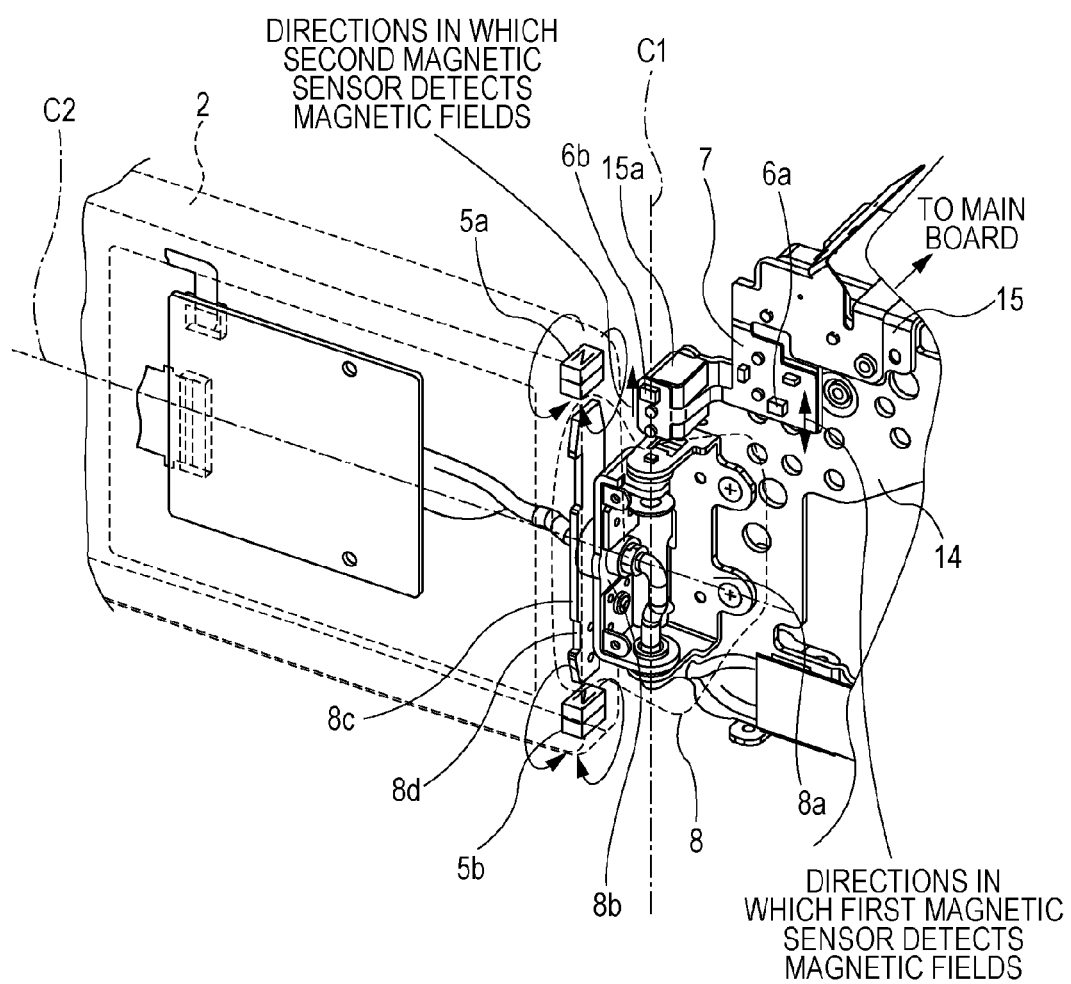
FIG. 8 is an enlarged perspective view of an area near a hinge portion of the digital camera according to the embodiment of the present invention.

FIG. 8 is an enlarged perspective view showing an area near the hinge portion 8 in FIG. 7. For convenience of the description, outer covers of the camera body 1 are not illustrated.

A sensor fixing member 15a is formed of a non-magnetic resin member, and is positioned at and fixed to the upper surface chassis 15. The resin member is provided for fixing the magnetic sensor to prevent erroneous detection from occurring due to disturbance of magnetic fields because the member is arranged directly below the second magnetic sensor with high sensitivity. A portion for fixing the magnetic sensor may be formed integrally with the upper surface chassis 15 by bending into a Z-like shape. However, if the upper surface chassis 15 is bent, stainless steel may become martensite, and become easily magnetized. This may disturb magnetic fields near the magnetic sensor, possibly resulting in erroneous detection. To prevent this, the non-magnetic resin member is used as the fixing member for the magnetic sensor.

The second magnetic sensor 6b is arranged near the first magnetic sensor 6a. Accordingly, the shape of the upper surface FPC 7 when being developed into a plan can be reduced in size. The reduction in size is also advantageous for the cost.

Next, the configuration of the hinge portion 8 will be described. The hinge portion 8 mainly includes a base metal plate 8a, a metal plate 8b, and a metal plate 8c. The hinge portion 8 is formed of metal members with high intensities. Also, the hinge portion 8 includes a torque spring that generates a sliding torque during rotation, a stopper member that restricts rotation, etc. These hinge forming members include members made of magnetic bodies, and hence are arranged so as not to disturb the magnetic fields. The base metal plate 8a is positioned with high accuracy at and fixed to the main chassis 14. Also, the metal plate 8c has a recess 8d. The recess 8d engages with the protrusion of the front case 2b of the display unit 2 as described above.

Next, the arrangement of the magnets 5a and 5b will be described. The magnets 5a and 5b are arranged in the display unit 2 such that, when the display unit 2 is in the full-closed state and the display portion 2a faces inward, the north poles of the magnets 5a and 5b are located at the upper side of the camera body and the south poles are located at the lower side. In FIG. 8, magnetic lines of force generated from the respective magnets are exemplarily indicated by arrows starting at positions near the north poles.

Also, in FIG. 8, directions of magnetic fields that are detected by the respective magnetic sensors are exemplarily indicated by arrows at positions near the first magnetic sensor 6a and the second magnetic sensor 6b. Since the first magnetic sensor 6a uses the dual-polarity two-output GMR sensor, the first magnetic sensor 6a can output a signal obtained by detecting a magnetic field that is parallel to the first axis C1 and is directed from the upper side to the lower side of the camera, and a signal obtained by detecting a magnetic field that is parallel to the first axis C1 and is directed from the lower side to the upper side. For example, when the display unit 2 is rotated in a closing direction around the first axis C1 and the magnet 5a approaches the first magnetic sensor 6a, the magnetic field generated from the magnet 5a and is directed form the upper side to the lower side starts penetrating through the first magnetic sensor 6a. Then, if the magnetic-flux density exceeds the threshold, a first output (output signal indicative of a detection result of the magnetic field from the upper side to the lower side) of the first magnetic sensor 6a is changed from HIGH to LOW. In contrast, a second output (output signal indicative of a detection result of the magnetic field from the lower side to the upper side) is HIGH without being changed because the direction of the magnetic field is opposite. As described above, for the detection result of the first magnetic sensor 6a, the first detection result is changed from OFF to ON, and the second detection result is ON without being changed.

In the state shown in FIG. 8, the magnetic-flux density of the magnetic field penetrating through the second magnetic sensor 6b is the threshold or higher. However, since the second magnetic sensor 6b is the single-polarity GMR sensor, the direction of the magnetic field penetrating through the second magnetic sensor 6b is different from the direction that the second magnetic sensor 6b can detect, and hence does not detect the magnetic field. That is, the output of the second magnetic sensor 6b is HIGH without being changed, and the detection result is OFF. However, if the display unit 2 is rotated by about +180° around the second axis C2 from the state in FIG. 8, the magnet 5b approaches the second magnetic sensor 6b. The magnetic field generated from the magnet 5b penetrates through the second magnetic sensor 6b. In this case, the magnetic field of the magnet 5b is directed from the lower side to the upper side of the camera, and the magnetic-flux density exceeds the threshold of the second magnetic sensor 6b. Accordingly, the output signal of the second magnetic sensor 6b is changed from HIGH to LOW, and the detection result is changed from OFF to ON.

Next, transition of the positions of the magnets 5a and 5b as the result of the rotation operation of the display unit 2, and the directions and magnetic-flux densities of the magnetic fields penetrating through the first magnetic sensor 6a and the second magnetic sensor 6b will be described with reference to FIGS. 9A to 9F, 10A and 10B, and 11. Each of three-view illustrations in FIGS. 9A to 9F includes an upper left illustration that is viewed from the side surface near the hinge portion of the camera body 1, an upper right illustration that is viewed from the rear surface of the camera body 1, and a lower illustration that is viewed from the bottom surface of the camera body 1.

Figure 9A:
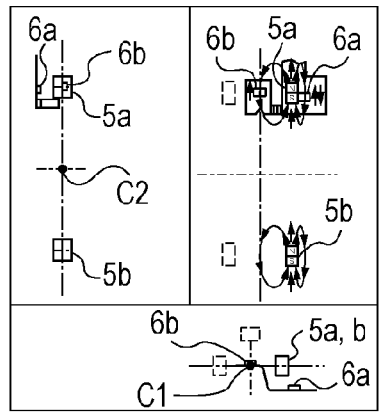
FIGS. 9A to 9F are three-view illustrations each showing a transition example of the positional relationship between magnetic sensors and magnets when the display unit of the digital camera according to the embodiment of the present invention is moved.
Figure 9B:
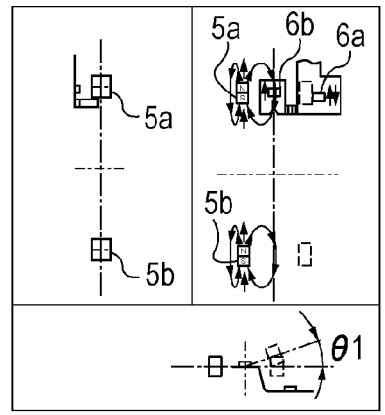
Figure 9C:
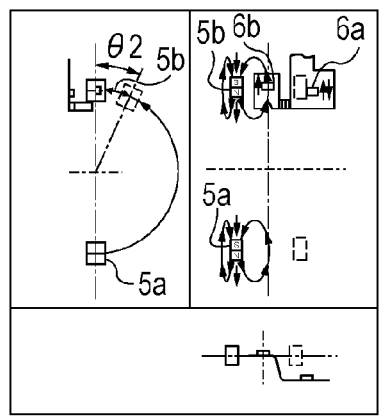
Figure 9D:
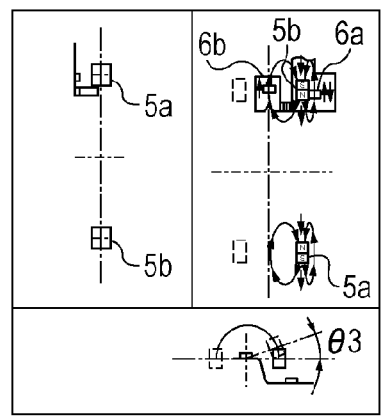
Figure 9E:
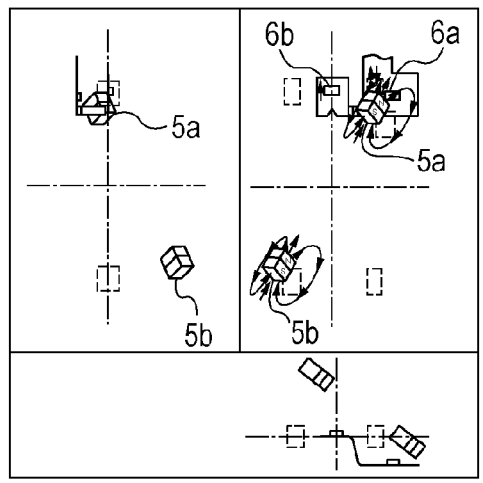
Figure 9F:
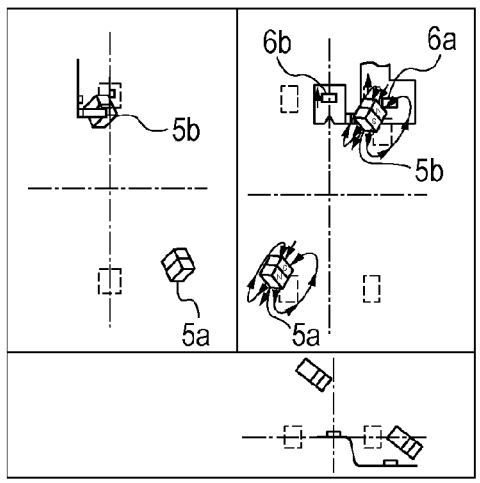

FIG. 9A is a three-view illustration showing only the two magnetic sensors and the two magnets in a first state (opening angle being 0°, rotation angle being 0°) in which the display portion 2a faces inward with respect to the camera body 1 and the display unit 2 is closed. FIG. 9B is a three-view illustration showing only the two magnetic sensors and the two magnets in a second state (opening angle being 180°, rotation angle being 0°) in which the display unit 2 is rotated from the first state with respect to the camera body 1 by 180° around the first axis C1. FIG. 9C is a three-view illustration showing only the two magnetic sensors and the two magnets in a third state (opening angle being 180°, rotation angle being)+180° in which the display unit 2 is rotated from the second state with respect to the camera body 1 by +180° around the second axis C2. FIG. 9D is a three-view illustration showing only the two magnetic sensors and the two magnets in a fourth state (opening angle being 0°, rotation angle being)+180° in which the display portion 2a faces outward with respect to the camera body 1 and the display unit 2 is rotated around the first axis C1. FIG. 9E is a three-view illustration showing only the two magnetic sensors and the two magnets in a fifth state (opening angle being 60°, rotation angle being)-60° in which the display unit 2 is rotated with respect to the camera body 1 in the − direction around the second axis C2 during the transition between the first state and the second state. FIG. 9F is a three-view illustration showing only the two magnetic sensors and the two magnets in a sixth state (opening angle being 60°, rotation angle being)+120° in which the display unit 2 is rotated with respect to the camera body 1 in the − direction around the second axis C2 during the transition between the third state and the fourth state.

Figure 10A:
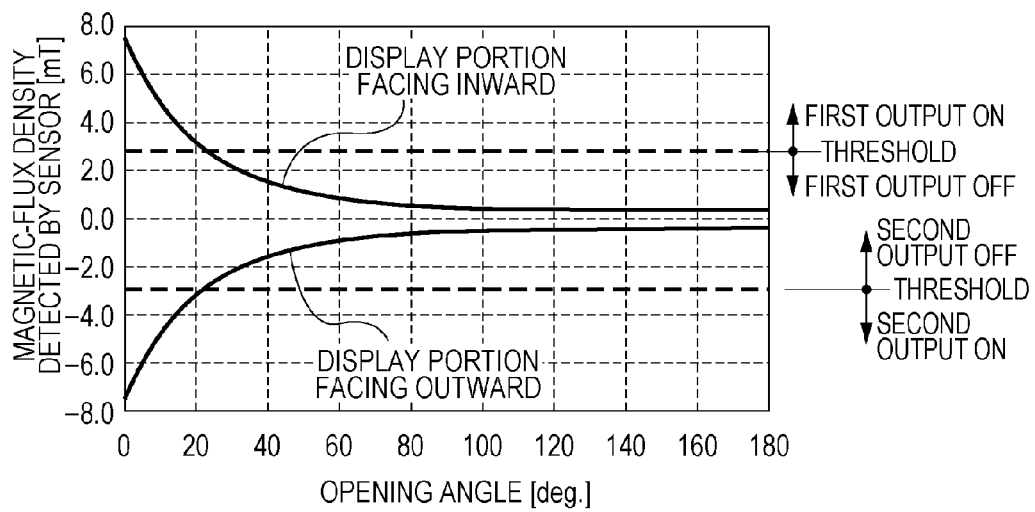
FIGS. 10A and 10B are illustrations showing transition examples of magnetic-flux densities that the magnetic sensors receive from the magnets as the result of an open/close operation.
Figure 10B:
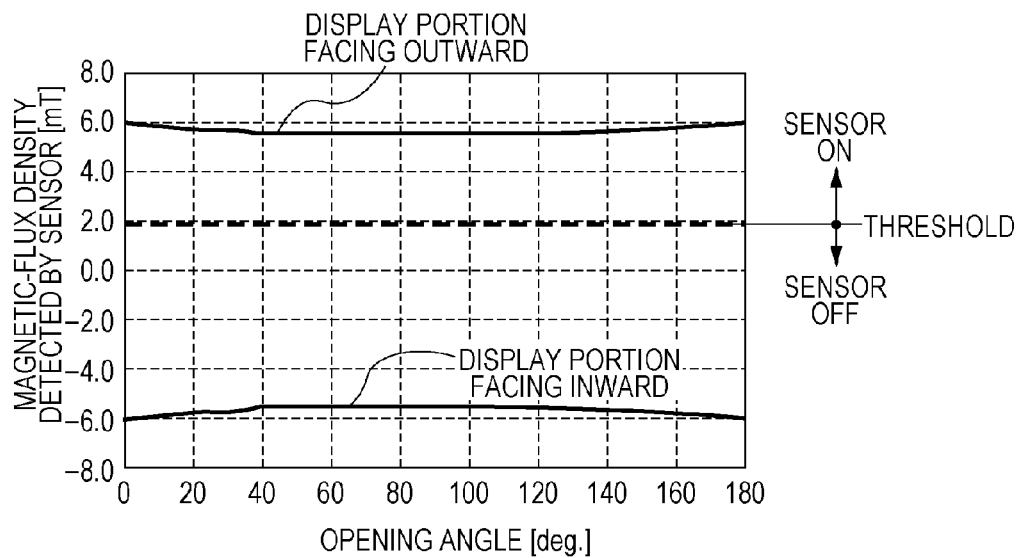

FIG. 10A is an illustration showing transition of the densities of the magnetic fluxes that the first magnetic sensor 6a receives from the magnets 5a and 5b as the result of the open/close operation of the display unit 2. FIG. 10B is an illustration showing transition of the densities of the magnetic fluxes that the second magnetic sensor 6b receives from the magnets 5a and 5b as the result of the open/close operation of the display unit 2.

Figure 11:
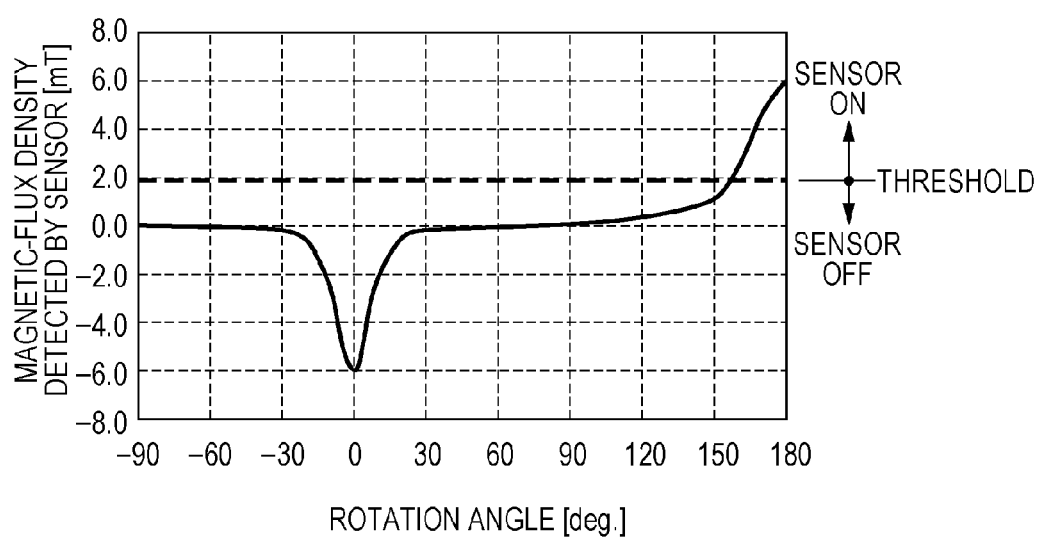
FIG. 11 is an illustration showing a transition example of a magnetic-flux density that the magnetic sensor receives from the magnet as the result of a rotation operation.

FIG. 11 is an illustration showing transition of the densities of the magnetic fluxes that the second magnetic sensor 6b receives from the magnets 5a and 5b as the result of the rotation operation of the display unit 2 from the second state.

First, the first state is described. In the first state, the magnetic field of the magnet 5a penetrates through the first magnetic sensor 6a from the upper side to the lower side of the camera (first direction). As shown in FIG. 10A, the magnetic-flux density is about 7 mT when the display portion faces inward and the opening angle is 0°. Accordingly, the first detection result of the first magnetic sensor 6a is ON, and the second detection result thereof is OFF.

In contrast, it is found that the density of the magnetic flux received by the second magnetic sensor 6b is about −6 mT from FIG. 10B. However, since the direction of the magnetic field is different from the direction that can be detected, the detection result of the second magnetic sensor 6b is OFF. That is, in the first state, the CPU 9c determines that the display unit 2 is in the closed state and the display portion 2a faces inward, based on the output signals of the first magnetic sensor 6a and the second magnetic sensor 6b.

Next, the transition from the first state to the second state will be described. Referring to the graph in FIG. 10A when the display portion faces inward, the density of the magnetic flux penetrating through the first magnetic sensor 6a is below the threshold at the opening angle of about 20°. θ1 in FIG. 9B corresponds to that opening angle. This angle is a critical angle. If the opening angle is larger than the critical angle, both the first detection result and the second detection result of the first magnetic sensor 6a become OFF.

The density of the magnetic flux penetrating through the second magnetic sensor 6b is substantially constantly −6.0 mT during the transition from the first state to the second state, and the detection result is constantly OFF during this period. This is because the second magnetic sensor 6b is arranged on the first axis C1. Erroneous detection of the rotation detection is prevented by restricting the change in magnetic-flux density as the result of the rotation operation of the display unit 2 around the first axis C1.

Next, the second state will be described. The second state is a state in which the display unit 2 is rotated from the first state by 180° around the first axis C1. At this time, since no magnet is located around the first magnetic sensor 6a, as shown in FIG. 10A, the density of the magnetic flux received by the first magnetic sensor 6a is close to 0 mT. That is, the magnetic-flux density is below the threshold of 3 mT. Accordingly, both the first detection result and the second detection result of the first magnetic sensor 6a are OFF.

In contrast, it is found that the density of the magnetic flux generated by the magnet 5a and received by the second magnetic sensor 6b is about −6 mT from FIG. 10B. However, since the direction of the magnetic field is different from the direction that can be detected, the detection result is OFF. That is, in the second state, the CPU 9c determines that the display unit 2 is in the open state and the display portion 2a faces inward, based on the output signals of the first magnetic sensor 6a and the second magnetic sensor 6b.

Next, the transition from the second state to the third state will be described. As shown in FIG. 11, the density of the magnetic flux penetrating through the second magnetic sensor 6b exceeds the threshold at the rotation angle of about +160°. θ2 in FIG. 9C corresponds to that rotation angle. This angle is a critical angle. If the rotation angle is lager than the critical angle, the detection result of the second magnetic sensor 6b is changed from OFF to ON.

In contrast, regarding the magnetic field received by the first magnetic sensor 6a, since the first magnetic sensor 6a is sufficiently separated from the magnets 5a and 5b, the first detection result and the second detection result of the first magnetic sensor 6a are constantly OFF without being changed.

Next, the third state will be described. The third state is a state in which the display unit 2 is rotated from the second state by +180° around the second axis C2. At this time, since no magnet is located around the first magnetic sensor 6a, the density of the magnetic flux received by the first magnetic sensor 6a is close to 0 mT. That is, the magnetic-flux density is below the threshold of 3 mT. Accordingly, both the first detection result and the second detection result of the first magnetic sensor 6a are OFF.

In contrast, the magnetic-flux density of the magnetic field generated from the magnet 5b and received by the second magnetic sensor 6b is about 6 mT as shown in FIG. 11. The direction of the magnetic field is the direction that can be detected. The detection result of the second magnetic sensor 6b is ON. That is, in the third state, the CPU 9c determines that the display unit 2 is in the open state and the display portion 2a faces outward, based on the output signals of the first magnetic sensor 6a and the second magnetic sensor 6b.

Next, the transition from the third state to the fourth state will be described. Referring to the graph in FIG. 10A when the display portion faces outward, the density of the magnetic flux penetrating through the first magnetic sensor 6a passes the threshold at the opening angle of about 20° in transition from the opening angle of 180° to the opening angle of 0°. θ3 in FIG. 9D corresponds to that opening angle. This angle is a critical angle. If the opening angle is the critical angle or smaller, the first detection result of the first magnetic sensor 6a is OFF without being changed, and the second detection result thereof is changed from OFF to ON.

In contrast, the density of the magnetic flux penetrating through the second magnetic sensor 6b is almost constantly 6.0 mT during the transition from the third state to the fourth state, and the detection result is constantly ON during this period. This is because the second magnetic sensor 6b is arranged on the first axis C1. Erroneous detection of the rotation detection is prevented by restricting the change in magnetic-flux density as the result of the rotation operation of the display unit 2 around the first axis C1. If the second magnetic sensor 6b is arranged at a position separated from the first axis C1, the density of the magnetic flux received by the second magnetic sensor 6b is changed. If the change in magnetic-flux density as the result of the open/close operation of the display unit 2 is a change that does not cause the magnetic-flux density to exceed the threshold, the change has no problem. However, if the change causes the magnetic-flux density to pass the threshold, the change may result in erroneous detection. Owing to this, the second magnetic sensor 6b may be arranged at a position separated from the first axis C1 but near the first axis C1 as long as the change in magnetic-flux density as the result of the open/close operation does not cause the magnetic-flux density to exceed the threshold.

Next, the fourth state will be described. The fourth state is a state in which the display unit 2 is rotated from the third state around the first axis C1 such that the opening angle becomes 0°. At this time, the magnetic field of the magnet 5b penetrates through the first magnetic sensor 6a from the lower side to the upper side of the camera (second direction). As shown in FIG. 10A, the density of the magnetic flux received by the first magnetic sensor 6a is about −7 mT when the display portion faces outward and the opening angle is 0°. Accordingly, the first detection result of the first magnetic sensor 6a is OFF, and the second detection result thereof is ON.

In contrast, the density of the magnetic flux received by the second magnetic sensor 6b is about 6 mT as shown in FIG. 11. Since the direction of the magnetic field is the direction that can be detected, the detection result is ON. That is, in the fourth state, the CPU 9c determines that the display unit 2 is in the closed state and the display portion 2a faces outward, based on the output signals of the first magnetic sensor 6a and the second magnetic sensor 6b.

Next, the fifth state will be described. The fifth state is a state in which the display unit 2 is rotated from the first state by about 60° around the first axis C1, and is rotated by about −60° around the second axis C2. In this state, the magnet 5a approaches the first magnetic sensor 6a although the display unit 2 is open with respect to the camera body 1. Also, since the relative positional relationship between the first magnetic sensor 6a and the magnet 5a is shifted from that in the first state, the first magnetic sensor 6a detects the magnetic field in the direction opposite to the direction in the first state. Accordingly, the density of the magnetic flux penetrating through the first magnetic sensor 6a exceeds −3 mT, hence the first detection result of the first magnetic sensor 6a becomes OFF, and the second detection result thereof becomes ON.

In contrast, it is found that the density of the magnetic flux generated by the magnet 5a and received by the second magnetic sensor 6b is about −6 mT from FIG. 10B. However, since the direction of the magnetic field is different from the direction that can be detected, the detection result is OFF.

Next, the sixth state will be described. The sixth state is a state in which the display unit 2 is rotated from the fourth state by about 60° around the first axis C1, and is rotated by about −60° around the second axis C2. In this state, the magnet 5b approaches the first magnetic sensor 6a although the display unit 2 is open with respect to the camera body 1. Also, since the relative positional relationship between the first magnetic sensor 6a and the magnet 5b is shifted from that in the fourth state, the first magnetic sensor 6a detects the magnetic field in the direction opposite to the direction in the fourth state. Accordingly, the density of the magnetic flux penetrating through the first magnetic sensor 6a exceeds 3 mT, hence the first detection result of the first magnetic sensor 6a becomes ON, and the second detection result thereof becomes OFF. In contrast, the density of the magnetic flux received by the second magnetic sensor 6b is about 6 mT as shown in FIG. 11. Since the direction of the magnetic field is the direction that can be detected, the detection result is ON.

Next, moving states of the display unit 2, detection results of the magnetic sensors, and display forms of the display portion will be described in detail with reference to FIG. 12.

In the first state (see FIGS. 3A and 9A), the first detection result of the first magnetic sensor 6a is ON and the second detection result thereof is OFF, and the detection result of the second magnetic sensor 6b is OFF. When such detection results are obtained, the display unit 2 is closed while the display portion 2a faces inward. The photographer cannot visually check the display portion 2a. The CPU 9c performs display control such that the light of the display portion 2a is turned OFF, and the display portion 2a displays nothing (first display form).

In the second state (see FIGS. 3C and 9B), both the first and second detection results of the first magnetic sensor 6a are OFF, and the detection result of the second magnetic sensor 6b is OFF. When such detection results are obtained, the CPU 9c performs display control for the display portion 2a such that an image based on an object image formed on the image pickup element such as a CCD sensor through the photographic optical system (not shown) is displayed in the normal state (second display form). Thus, as shown in FIG. 3C, in the state in which the display unit 2 is open (opening angle being about 180°), the photographer can easily check a composition while viewing the image displayed on the display portion 2a.

In the third state (see FIGS. 4C and 9C), both the first and second detection results of the first magnetic sensor 6a are OFF, and the detection result of the second magnetic sensor 6b is ON. When such detection results are obtained, the CPU 9c performs display control for the display portion 2a such that an image is displayed in a vertically inverted form (third display form) with respect to the normal state. In this state, the display portion 2a faces the front surface side of the camera body 1. This state is suitable when the photographer takes a photograph by himself/herself.

In the fourth state (see FIGS. 4E and 9D), the first detection result of the first magnetic sensor 6a is OFF and the second detection result thereof is ON, and the detection result of the second magnetic sensor 6b is ON. When such detection results are obtained, the CPU 9c performs display control for the display portion 2a such that an image is displayed in a vertically and horizontally inverted form (fourth display form) with respect to the normal state. In this state, the display portion 2a faces the rear surface side of the camera body 1, and the optical axis of the photographic optical system is substantially aligned with the center portion of the display portion 2a. The photographer can easily follow a moving object.

In the fifth state (see FIGS. 5A and 9E), the first detection result of the first magnetic sensor 6a is OFF and the second detection result thereof is ON, and the detection result of the second magnetic sensor 6b is OFF. When such detection results are obtained, the CPU 9c determines that the state is during the transition between the first state and the second state, and performs display control for the display portion 2a such that an image in the normal state is displayed.

In the sixth state (see FIGS. 5B and 9F), the first detection result of the first magnetic sensor 6a is ON and the second detection result thereof is OFF, and the detection result of the second magnetic sensor 6b is ON. When such detection results are obtained, the CPU 9c determines that the state is during the transition between the third state and the fourth state, and performs display control for the display portion 2a such that an image is displayed in a vertically and horizontally inverted form with respect to the normal state.

As described above, the different signal is output in accordance with the direction of the magnetic field detected by the first magnetic sensor that is used for the open/close detection of the display unit 2, and the moving state of the display unit 2 is determined based on the combination of the output from the first magnetic sensor with the output from the second magnetic sensor that is used for the rotation detection of the display unit 2. If a predetermined combination is output while the display unit 2 is opened or closed and rotated with respect to the camera body 1, control is performed similarly to control based on output signals that are obtained immediately before the output signals of the predetermined combination are obtained.

In other words, in a state in which the first magnetic sensor does not detect a magnetic field in any direction of the first and second directions, if the first magnetic sensor detects a magnetic field in one direction, control that is different from control in the state in which the magnetic field in any direction of the first and second directions is not detected is performed. If a magnetic field in the other direction is detected, control that is similar to the control in the state in which the magnetic field in any direction of the first and second directions is not detected is performed. Also, in accordance with the output signal of the second magnetic sensor, control is switched between control that is performed if the first magnetic sensor detects the magnetic field in the first direction and control that is performed if the first magnetic sensor detects the magnetic field in the second direction.

In this way, erroneous display control that does not correspond to the moving state of the display unit 2 during the transition of the state of the display unit 2 can be prevented from being performed. When the output signals of the predetermined combination are obtained, the output signals may be ignored and the display form based on previously obtained output signals may be continuously used.

In this embodiment, the magnetic sensor uses the GMR sensor that detects the magnetic field parallel to the principal plane (see FIGS. 6A to 6D). However, the type of magnetic sensor is not limited thereto. For example, even if the Hall sensor that detects the magnetic field perpendicular to the principal plane is used, detection result similar to that of the GMR sensor can be obtained as long as the direction that can be detected is arranged in parallel to the first axis C1.

Also, in this embodiment, the detection threshold of the first magnetic sensor is 3 mT, and the detection threshold of the second magnetic sensor is 2 mT. However, the values of the detection thresholds are not limited thereto. The value of the detection threshold may be determined in accordance with the opening angle and the rotation angle at which the display form is changed.

Also, the magnets 5a and 5b have the north poles at the upper side and the south poles at the lower side of the body in the first state. However, it is not limited thereto. If the magnetic poles of the magnets are inverted, the detection directions of the magnetic sensors may be properly changed.

The magnets 5a and 5b have the same magnetic-flux density and the same shape. However, it is not limited thereto. Magnets with different magnetic-flux densities and different shapes may be used as long as the magnetic flux densities do not exceed the thresholds in FIGS. 10A, 10B, and 11.

Also, in this embodiment, the digital camera is described as an example of the electronic device to which the present invention is applied. However, the present invention may be applied to an electronic device other than the digital camera, such as a mobile phone, as long as an electronic device is configured such that a movable unit is coupled with a body rotatably with respect to a body around a first axis and a second axis.

Also, this embodiment is used for performing the display control for the display portion 2a in accordance with the moving state of the display unit 2 with respect to the camera body 1. However, the embodiment may be used for other control that is performed by the CPU 9c based on the detection results of the two magnetic sensors. For example, in a configuration in which an operation unit is provided at the display unit 2, this embodiment may be used to switch the state of the operation unit between an activated state and a deactivated state based on the detection results of the two magnetic sensors, or to change an effect obtained by operating the operation unit based on the detection results of the two magnetic sensors. Alternatively, in a configuration having a function of distinguishing a photographing scene with a camera and automatically setting a photographic condition suitable for the photographing scene, this embodiment may be used to set the photographic condition based on the detection results of the two magnetic sensors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-184278 filed Aug. 19, 2010 and No. 2010-184279 filed Aug. 19, 2010, which are hereby incorporated by reference herein in their entirety.

What is claimed is:

1. An electronic device comprising:
a body; and
a movable unit coupled with the body, the movable unit being rotatable with respect to the body around a first axis and a second axis that is substantially perpendicular to the first axis,
wherein the movable unit includes a first magnetic-field generating portion arranged near an end which is near the first axis, among the ends of the movable unit, and
a second magnetic-field generating portion arranged at a position where the second magnetic-field generating portion is substantially symmetric to the first magnetic-field generating portion about the second axis, and
wherein the body includes a first magnetic-field detection sensor arranged near a position where the first magnetic-field detection sensor faces one of the first and second magnetic-field generating portions in a state in which the movable unit is rotated around the first axis and approaches the body,
a second magnetic-field detection sensor arranged at a position where a change in a detection result of the second magnetic-field detection sensor is restricted in a case where the movable unit is rotated around the first axis, and
a control unit configured to perform control in accordance with a state of the movable unit with respect to the body based on output signals of the first and second magnetic-field detection sensors.

2. The electronic device according to claim 1, wherein the second magnetic-field detection sensor is arranged near the first magnetic-field detection sensor.

3. The electronic device according to claim 1, wherein the second magnetic-field detection sensor is arranged on the first axis.

4. The electronic device according to claim 1,
wherein the first magnetic-field detection sensor can detect magnetic fields in different directions, and
wherein the second magnetic-field detection sensor can detect only a magnetic field in a direction.

5. The electronic device according to claim 1,
wherein the movable unit further includes a display unit configured to display an image,
wherein the control unit changes a display form of the display unit in accordance with the state of the rotation of the movable unit around the first axis and a state of the rotation of the movable unit around the second axis with respect to the body.

6. The electronic device according to claim 1, wherein the movable unit is coupled with the body through a hinge unit.

7. The electronic device according to claim 6, wherein a connecting line passing through the hinge unit and electrically connecting the body with the movable unit enters the hinge unit at a position on the first axis of the body, from a side where the second magnetic-field detection sensor is not arranged.

8. The electronic device according to claim 1, wherein the first magnetic-field detection sensor can detect magnetic fields in different directions and outputs different signals in accordance with directions of the detected magnetic fields.

9. The electronic device according to claim 8, wherein, if a combination of an output signal of the first magnetic-field detection sensor and an output signal of the second magnetic-field detection sensor is a predetermined combination, the control unit performs control that is similar to control based on output signals obtained immediately before the output signals of the predetermined combination are obtained.

10. The electronic device according to claim 8, wherein, if the combination of the output signal of the first magnetic-field detection sensor and the output signal of the second magnetic-field detection sensor is the predetermined combination, the control unit ignores the output signals of the predetermined combination and continuously performs control based on output signals obtained immediately before the output signals of the predetermined combination are obtained.

11. The electronic device according to claim 8, wherein, if a state in which the first magnetic-field detection sensor does not detect a magnetic field in any direction becomes a state in which the first magnetic-field detection sensor detects a magnetic field in a first direction, the control unit performs control that is different from control in the state in which the first magnetic-field detection sensor does not detect a magnetic field in any direction, and if the state in which the first magnetic-field detection sensor does not detect a magnetic field in any direction becomes a state in which the first magnetic-field detection sensor detects a magnetic field in a second direction, the control unit performs control similar to the control in the state in which the first magnetic-field detection sensor does not detect a magnetic field in any direction.

12. The electronic device according to claim 8, wherein the control unit switches control between control that is performed if the first magnetic-field detection sensor detects a magnetic field in a first direction and control that is performed if the first magnetic-field detection sensor detects a magnetic field in a second direction, in accordance with the output signal of the second magnetic-field detection sensor.

13. The electronic device according to claim 1, wherein the first magnetic-field detection sensor and the second magnetic-field detection sensor do not rotate with respect to the body.

* * * * *